United States Patent
Oskwarek

(10) Patent No.: US 10,383,175 B2
(45) Date of Patent: Aug. 13, 2019

(54) METHOD AND APPARATUS FOR THE MELTING OF SNOW AND ICE FROM VEHICLE EXTERIORS

(71) Applicant: John Oskwarek, Iselin, NJ (US)

(72) Inventor: John Oskwarek, Iselin, NJ (US)

(*) Notice: Subject to any disclaimer, the term of this patent is extended or adjusted under 35 U.S.C. 154(b) by 176 days.

(21) Appl. No.: 15/384,465

(22) Filed: Dec. 20, 2016

(65) Prior Publication Data
US 2017/0238363 A1    Aug. 17, 2017

Related U.S. Application Data

(60) Provisional application No. 62/270,351, filed on Dec. 21, 2015.

(51) Int. Cl.
| | |
|---|---|
| H05B 1/02 | (2006.01) |
| H05B 3/56 | (2006.01) |
| F28D 15/00 | (2006.01) |
| F28F 27/00 | (2006.01) |
| B60S 1/02 | (2006.01) |
| B60S 1/66 | (2006.01) |
| H05B 3/28 | (2006.01) |
| F28D 21/00 | (2006.01) |

(52) U.S. Cl.
CPC .......... *H05B 1/0236* (2013.01); *B60S 1/026* (2013.01); *B60S 1/66* (2013.01); *F28D 15/00* (2013.01); *F28F 27/00* (2013.01); *H05B 3/28* (2013.01); *H05B 3/56* (2013.01); *F28D 2021/008* (2013.01); *F28D 2021/0092* (2013.01); *F28F 2250/08* (2013.01); *H05B 2214/02* (2013.01)

(58) Field of Classification Search
CPC .......... H05B 1/0236; H05B 3/28; H05B 3/56; H05B 2214/02; F28D 2021/008; F28D 2021/0092; F28D 15/00; F28F 27/00; F28F 2250/08
USPC .......... 219/202, 213, 497, 491, 494
See application file for complete search history.

(56) References Cited

U.S. PATENT DOCUMENTS

| | | | |
|---|---|---|---|
| 5,643,482 A | 7/1997 | Sandelman et al. | |
| 6,282,919 B1* | 9/2001 | Rockenfeller | B60H 1/00007 62/480 |
| 6,695,037 B1* | 2/2004 | Humburg | B60H 1/00557 165/51 |
| 6,946,621 B1 | 9/2005 | Roseman | |
| 7,345,445 B2 | 3/2008 | Huntzicker | |

(Continued)

*Primary Examiner* — Mark H Paschall
(74) *Attorney, Agent, or Firm* — Law Offices of John Skinner; John J. Skinner, Jr.

(57) ABSTRACT

An apparatus and method for melting snow and/or ice on a vehicle comprises a precipitation sensor, a surface temperature sensor, an ambient temperature sensor, a heater, and a programmable controller. The programmable controller comprises a memory unit to store a cut off surface temperature Tc, and a set of program modules. The programmable controller further comprises a processor to execute the set of program modules. A heater control module, executed by the processor, is configured to deactivate a heater based on a surface temperature being greater than the cut off surface temperature. Further, heater control module is configured to activate the heater based on an ambient temperature being lower than freezing point of water and precipitation being present outside the vehicle, thereby melting snow and/or ice on the vehicle. The snow melts off because of heat generated by the heater upon activation.

8 Claims, 8 Drawing Sheets

(56) References Cited

U.S. PATENT DOCUMENTS

| | | |
|---|---|---|
| 7,518,093 B2 | 4/2009 | Veerasamy et al. |
| 7,783,400 B1 * | 8/2010 | Zimler ................. B60S 1/0866 |
| | | 219/202 |
| 8,157,217 B1 | 4/2012 | Anderson |
| 9,045,043 B2 * | 6/2015 | Hoke ................. B60H 1/00785 |
| 9,121,179 B2 | 9/2015 | Bublitz |
| 9,290,273 B1 * | 3/2016 | Thompson ............. G05D 23/19 |
| 9,321,364 B1 * | 4/2016 | Ashworth ................. B60L 5/02 |
| 9,855,920 B2 * | 1/2018 | Castello ................. B60S 1/026 |
| 9,981,633 B2 * | 5/2018 | Lisinski ................. B32B 17/10 |
| 2004/0021575 A1 | 2/2004 | Oskorep |
| 2008/0197122 A1 * | 8/2008 | Gober .................... B60J 1/2011 |
| | | 219/203 |

* cited by examiner

METHOD AND APPARATUS FOR THE MELTING OF SNOW AND ICE FROM VEHICLE EXTERIORS

CROSS REFERENCE TO PRIOR APPLICATION

This patent application claims the benefit of U.S. Provisional Application No. 62/270,351 filed on Dec. 21, 2015. The above provisional application is incorporated by reference herein in its entirety.

FIELD OF THE INVENTION

The present invention is directed to a method and apparatus for the melting of snow and ice from vehicle exteriors, and, more particularly, to a method and apparatus for melting snow or ice from an exterior of a vehicle, and preventing the accumulation thereon, by means of heating elements secured within a vehicle's exterior.

BACKGROUND OF THE INVENTION

In cold weather climes, the accumulation of snow and/or ice on the exterior of vehicles can be problematic in many different contexts. Unchecked, such accumulation can slow or even bring to a halt transportation of people and cargo, perhaps at its worst costing lives and/or the loss of significant sums of money.

Indeed, vehicles are often designed with aerodynamic and safety engineering considerations in mind. Companies and their engineers spend significant resources on the aerodynamic and safety design of, by way of example, automobiles and aircraft. Even the smallest amount of snow or ice buildup on the exteriors of such transport vehicles can negatively impact such aerodynamic and safety designs and decrease operability.

Currently the airline industry spends millions of dollars on de-icing compounds to de-ice aircraft before take-off. Application of such needs to be closely monitored and, in case of delays, even reapplied.

Automobile owners, having no such system, are often forced to manually remove snow and ice from their automobile exteriors. Needless to say, such removal is not easy or comfortable. Due to changes in the laws of many cold weather clime States, such snow/ice removal is now mandatory. Drivers who fail to remove snow/ice may be cited/ticketed for failing to remove such snow/ice for creating unsafe driving conditions.

While many vehicles are equipped with automatic snow/ice removal systems for their windows, no such apparatus or methodology currently exists for the vehicle exteriors. Thus as can be seen, there is a need which as heretofore not been met or resolved.

SUMMARY OF THE INVENTION

Accordingly, the present invention is directed to providing a method and apparatus for the prevention of the accumulation of snow and ice on a vehicle exterior, and/or which melts accumulated snow and ice from the top of a vehicle, by means of heating elements secured within the vehicle's top. The heating elements consist of electric radiant heating cables or hydronic radiant heating tubes.

As taught by the present invention, the electric heat system can be optioned to function using a remote power source, the vehicle power source, or both. Additionally as taught by the present invention, the hydronic heat system utilizes hot fluid (water/glycol solution) from the radiator or engine block as its heating medium.

The present invention allows for automatic snow and ice melting using environmental feedback from temperature and precipitation sensors. These sensors may be integral to the vehicle's environmental/engine management systems and/or separate sensors installed as part of the snowmelt system.

In an embodiment of the present invention, an apparatus for melting snow and/or ice on a vehicle comprises a precipitation sensor, a surface temperature sensor, an ambient temperature sensor, a heater, and a programmable controller. The programmable controller comprises a memory unit to store a cut off surface temperature Tc, and a set of program modules. The programmable controller further comprises a processor to execute the set of program modules. The set of program modules comprises an input module and a heater control module. The input module, executed by the processor, is configured to receive information regarding an ambient temperature Ta outside the vehicle via the ambient temperature sensor. Further, the input module, executed by the processor, is configured to receive information regarding one of presence and absence of precipitation outside the vehicle, via the precipitation sensor. Furthermore, the input module, executed by the processor, is configured to receive information regarding a surface temperature Ts on an exterior portion of the vehicle via the surface temperature sensor. The heater control module, executed by the processor, is configured to deactivate the heater based on the surface temperature Ts being greater than the cut off surface temperature Tc. Further, heater control module is configured to activate the heater based on the ambient temperature Ta being lower than freezing point of water and precipitation being present outside the vehicle, thereby melting snow and/or ice on the vehicle because of heat generated by the heater upon activation.

In an embodiment of the present invention, the heater is at least one of an electric heater and a hydronic heater. The electric heater comprises a plurality of heating cables disposed on an exterior portion of the vehicle, electrically coupled to an electric power source via a relay or multiple relays, the plurality of heating cables configured to receive electric power from the electric power source, and heat the exterior portion of the vehicle, melting snow and/or ice on the vehicle. Further, the hydronic heater comprises a plurality of heating pipes disposed on the exterior portion of the vehicle, coupled to a radiator of the vehicle via an electric pump, and wherein the hydronic heater is configured to receive at least one of heated engine coolant or water from the radiator or engine block jacket, and circulate the heated engine coolant or water, thereby transferring heat to the exterior portion of the vehicle.

In an embodiment of the present invention, a method of melting snow and/or ice on a vehicle, the apparatus comprises storing in a memory unit, a cut off surface temperature, and a set of program modules. Further, the method comprises receiving, by a processor executing an input module, information regarding an ambient temperature outside the vehicle, from an ambient temperature sensor. Further, the method comprises receiving, by the processor executing the input module, information regarding one of presence and absence of precipitation outside the vehicle, from the precipitation sensor. Further, the method comprises receiving, by the processor executing the input module, information regarding a surface temperature on an exterior portion of the vehicle, from the surface temperature sensor. Further, the method comprises deactivating, by the processor executing a heater control module, the heater based on the surface temperature being greater than the cut off surface temperature. Further, the method comprises deactivating, by the processor executing a heater control module, based on certain safeties being triggered. Further, the method comprises activating the heater, by the processor executing the heater control module, based on the ambient temperature being lower than a freezing point of water, and precipitation outside the vehicle being present, thereby melting snow and/or ice on the vehicle.

The present invention, including its features and advantages, will become more apparent from the following detailed description with reference to the accompanying drawings.

DETAILED DESCRIPTION

FIGS. 1 through 8 illustrate a method and apparatus for a melting snow and/or ice, or preventing the build-up of such snow and/or ice, from the exterior of a vehicle by means of heating elements secured within the vehicle's exterior. It is to be understood, of course, that vehicles can include passenger vehicles (e.g., cars, trucks, vans, buses, minivans, Sports Utility Vehicles (SUV's), cross-over vehicles, etc.), cargo vehicles (e.g., trucks, vans, box trucks, etc.), cargo trailers (i.e. semi-trailers), trains, or any other mode of transportation within which people or cargo can be transported and/or for which accumulation of snow and/or ice is a detriment to such transportation.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope. A description of embodiments of the present invention will now be given with reference to the Figures.

Figure 1:
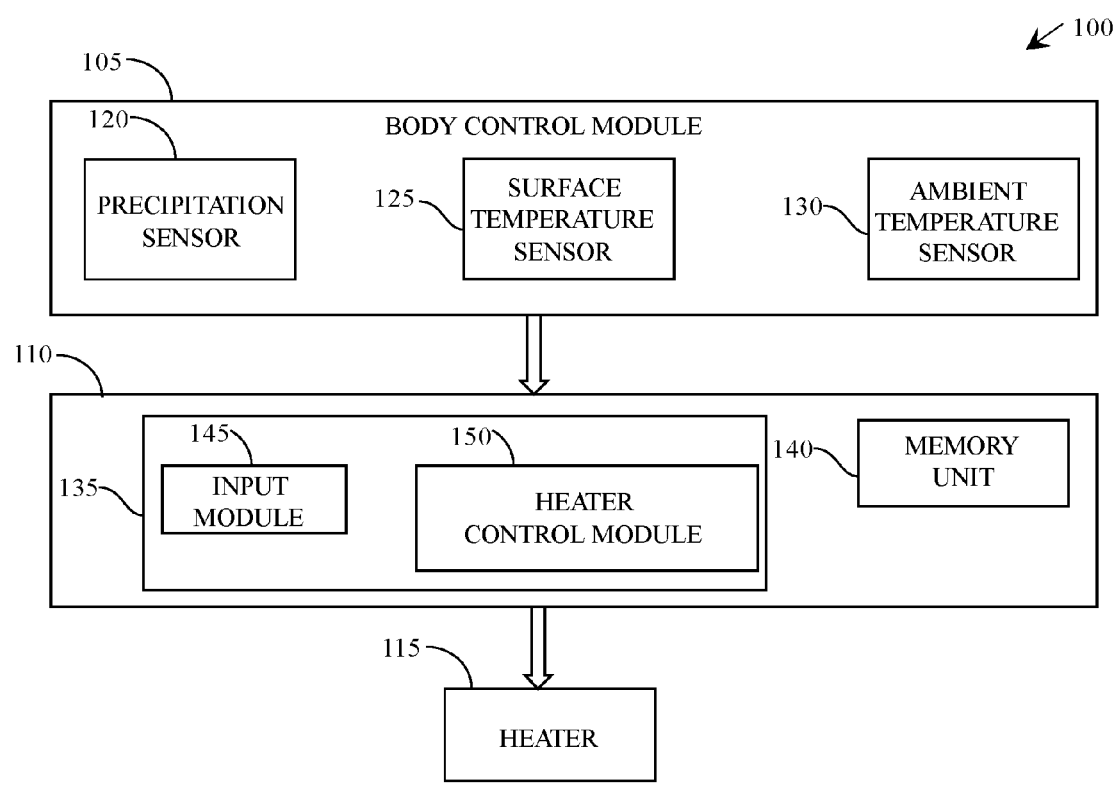
FIG. 1 is a block diagram of an apparatus for melting of snow and/or ice from vehicles, in accordance with various embodiments of the present invention.

FIG. 1 is a block diagram of an apparatus 100 for the melting of snow and/or ice from the exterior of vehicles in accordance with various embodiments of the invention. The apparatus 100 comprises a body control module 105, a programmable controller 110, and a heater 115.

The body control module 105 is an integral component of the vehicle, and comprises a precipitation sensor 120, a surface temperature sensor 125, and an ambient temperature sensor 130. In one example, the precipitation sensor 120 is an optical sensor. In another example, the precipitation sensor 120 is a TRW-Automotive model 7803 optical sensing system. In another example, the surface temperature sensor 125 is at least one of a thermistor and a thermocouple. In one example, the surface temperature 125 is a QTI model QT06024A sensor. In yet another example, the ambient temperature sensor 130 is a QTI model QT06005 sensor.

Further, the apparatus comprises a programmable controller 110. The programmable controller 110 is configured to activate and deactivate the heater 115. The programmable controller 110 comprises a memory unit 140 to store a cut off surface temperature Tc, and a set of program modules. The programmable controller 110 further comprises a processor 135 to execute the set of program modules. The set of program modules comprises an input module 145 and a heater control module 150. The input module 145, executed by the processor 135, is configured to receive information regarding an ambient temperature Ta outside the vehicle via the ambient temperature sensor 130. Further, the input module 145, executed by the processor 135, is configured to receive information regarding one of presence and absence of precipitation outside the vehicle, via the precipitation sensor 120. Furthermore, the input module 145, executed by the processor 135, is configured to receive information regarding a surface temperature Ts on an exterior portion of the vehicle via the surface temperature sensor 125. The heater control module 150, executed by the processor, is configured to deactivate the heater 115 based on the surface temperature Ts being greater than the cut off surface temperature Tc. Further, the heater control module, executed by the processor, is configured to deactivate the heater based on certain safeties being triggered. Further, heater control module 150 is configured to activate the heater 115 based on the ambient temperature Ta being lower than freezing point of water and precipitation being present outside the vehicle, thereby melting snow and/or ice on the vehicle. The snow and/or ice on a vehicle melts because of heat generated by the heater 115 upon activation.

The heater 115 is at least one of an electric heater and a hydronic heater. The electric heater comprises a plurality of heating cables (not shown) disposed on an exterior portion of the vehicle, electrically coupled to an electric power source (not shown) via a relay (not shown). The electric heater is configured to receive electric power from the electric power source, and heat the exterior portion of the vehicle, melting snow and/or ice on the vehicle. A block diagram of an electric heater is exemplarily illustrated in FIG. 2.

Figure 2:
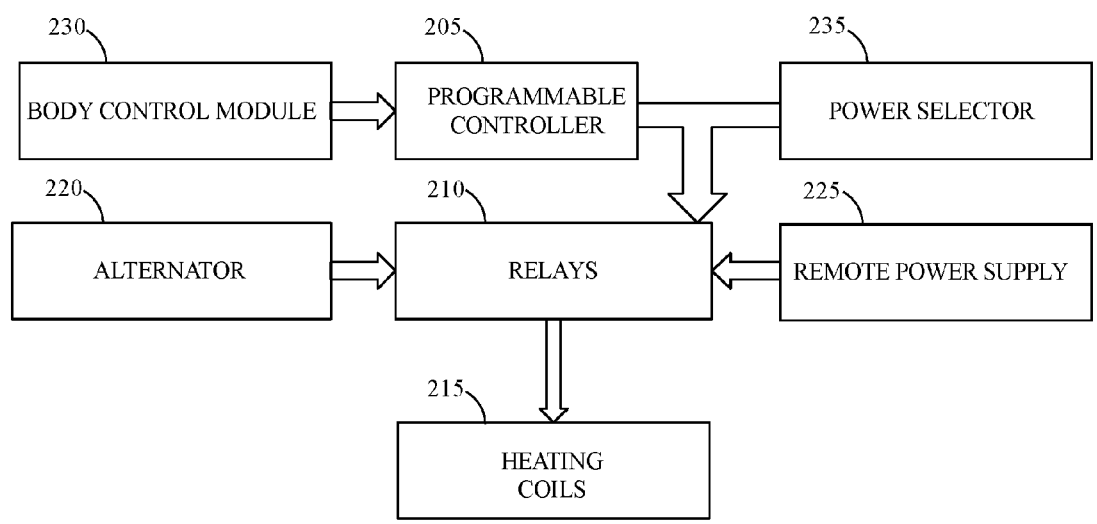
FIG. 2 is a block diagram of an electric heater, in accordance with various embodiments of the present invention.

Referring now to FIG. 2, a programmable controller 205 controls a plurality of relays 210 by sending control signals. The plurality of relays 210 connect a plurality of heating cables 215 with one of an alternator 220 in a vehicle and a remote power source 225. The remote power source 225 is at least one of an electric generator, and a domestic electric power supply.

As mentioned earlier, the programmable controller 205 receives information regarding a surface temperature Ts, an ambient temperature Ta and precipitation from a body control module 230 in the vehicle. If the ambient temperature Ta is lower than 32 degree Fahrenheit (freezing point of water), and precipitation is present, then the programmable controller 205 instructs the plurality of relays 210 to route electrical power from one of the alternator 220 and the remote power source 225 into the plurality of heating cables 215, thereby activating the plurality of heating cables 215. If the surface temperature Ts is greater than a cut off surface temperature Tc, then the programmable controller 205 instructs the plurality of relays 210 to disconnect the plurality of heating cables 215 from both of the alternator 220 and the remote power source 225, thereby deactivating the plurality of heating cables 215. Further, when certain safeties are triggered the controller instructs the plurality of relays to disconnect the plurality of heating cables from both of the alternator and the remote power source(s), thereby deactivating the plurality of heating cables. In one example, a user is enabled to select one of the alternator 220 and the remote power source 225 to supply electric power to the plurality of heating cables 215 via a power selector 235. Depending on at least one input provided to the power selector 235 by the user, the plurality of relays 210 route electrical power from one of the alternator 220 and the remote power source 225 into the plurality of heating cables 215. An exemplary illustration of arrangement of the plurality of heating cables 215 in the vehicle is given in FIG. 3.

Figure 3:
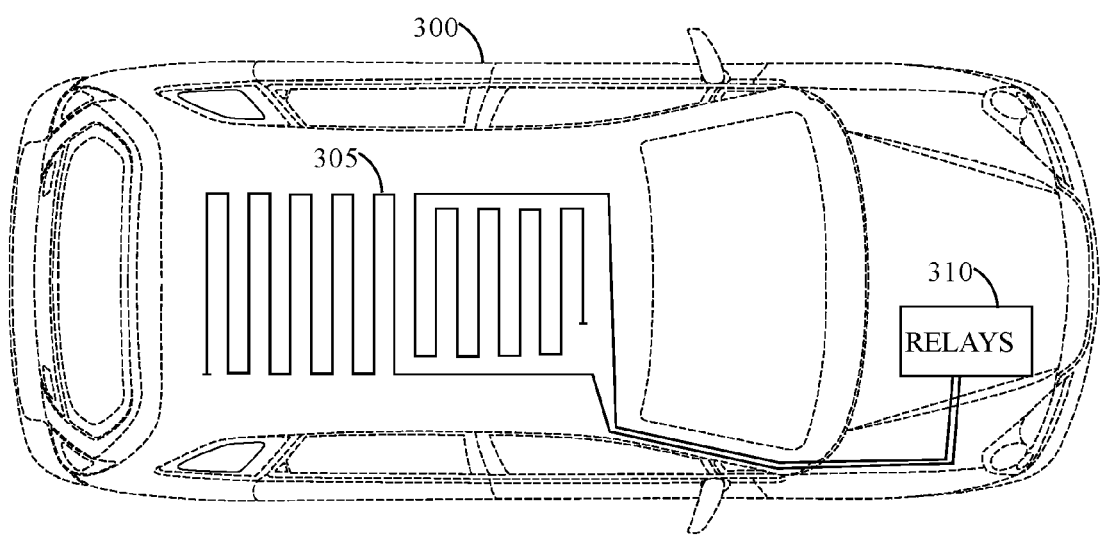
FIG. 3 is an exemplary illustration of arrangement of a plurality of heating cables in the apparatus for melting of snow and/or ice from vehicles, in accordance with various embodiments of the present invention.

Referring now to FIG. 3, a plurality of heating cables 305 are arranged on roof of a car 300. The plurality of heating cables 305 receives electric power from a plurality of relays 310 electrically coupled to an electric power source (not shown). An exemplary illustration of a heating cable among the plurality of heating cables 305, disposed on exterior of the vehicle is shown in FIG. 4.

Figure 4:
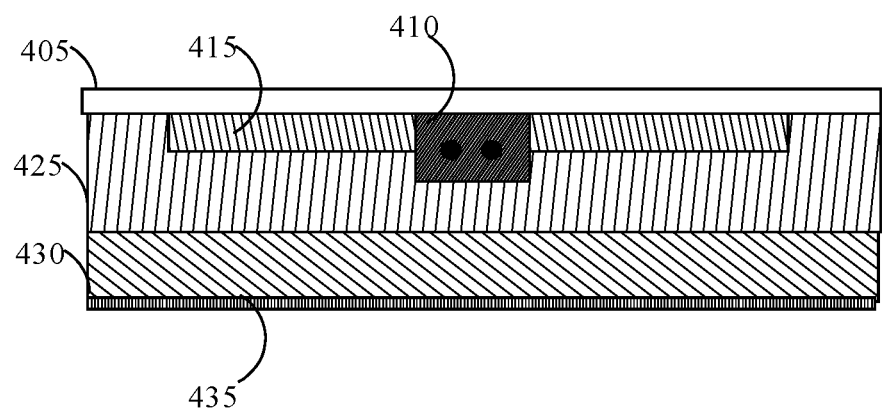
FIG. 4 is an exemplary illustration of a cross-section of the construction of the electric radiant heating cables and surrounding vehicle within which such heating element resides, in accordance with various embodiments of the present invention.

Referring now to FIG. 4, a heating cable 410 is secured directly below a roof 405 of a vehicle in a manner to maximize heat transfer between the heating cables 410 and the roof 405. The heating cable 410 is secured in place with a thermally conductive fastening layer 415. Further, the heating cable 410 is separated from other heating cables by a thermally conductive filler layer 425. The thermally conductive fastening layer 410 comprises at least one of thermally conductive clips and/or wireways pre-formed with the roof 405, thermally conductive clips and/or wireways (as noted above) affixed to the roof 405 by means welding or thermally conductive adhesives, and pre-wired, thermally conductive polymer (or other material) substrate assembly in which the heating cable 410 is embedded, said assembly then being secured to underside of the roof 405 by means of screws, bolts or clips with receivers formed in the roof 405. Additionally, to control heat distribution towards exterior of the roof 405), a layer of insulating material 430 is installed to cover a passenger compartment or cargo bay side of the vehicle. The layer of insulating material 430 minimizes heat transfer into the passenger compartment or the cargo bay.

In one example, the heating cable 410 is sandwiched between underside of the roof 405 and an inner roof 435. Voids between the roof 405 and the inner roof 435 are filled with the thermally conductive filler layer 425 to promote heat distribution. The layer of insulating material 430 is installed to cover the passenger or cargo bay side of the vehicle.

Referring back to FIG. 3 and by way of further example, the plurality of heating cables 305 is connected to the plurality of relays 310 via a plurality of pillars (not referenced with numerals), which support the roof structure from the body of the vehicle. The plurality of pillars are utilized as pathways to route necessary wiring between the plurality of heating cables 305 and the plurality of relays 310. For cargo vehicles, wiring between the plurality of heating cables 305 and the plurality of relays 310, are routed in protective wireways mounted inside or outside the cargo vehicles.

Referring back to FIG. 1, in one example, the heater 115 is a hydronic heater. The hydronic heater comprises a plurality of heating pipes. A block diagram of a hydronic heater is exemplarily illustrated in FIG. 5.

Figure 5:
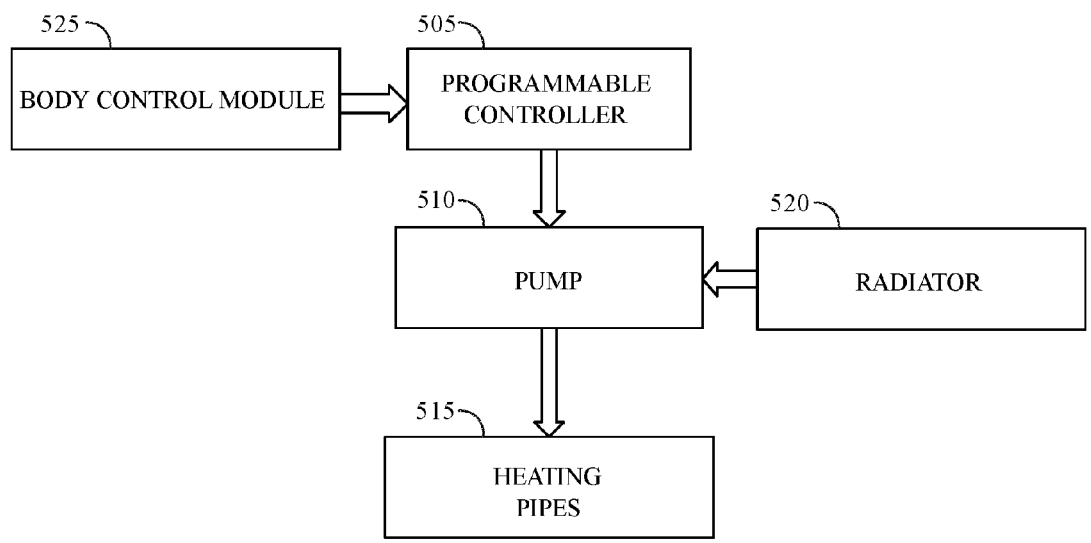
FIG. 5 is a block diagram of a hydronic heater, in accordance with various embodiments of the present invention.

Referring now to FIG. 5, a programmable controller 505 controls a pump 510 by sending control signals. The pump 510 connects a plurality of heating pipes 515 with a radiator 520 in a vehicle. The radiator 520 contains heated engine coolant. As mentioned earlier, the programmable controller 505 receives information regarding a surface temperature Ts, an ambient temperature Ta and precipitation from a body control module 525 in the vehicle. If the ambient temperature Ta is lower than 32 degree Fahrenheit (freezing point of water), and precipitation is present, then the programmable controller 505 instructs the pump 510 to pump one of the heated water and heated coolant liquid from the radiator 520 into the plurality of heating pipes 515, thereby heating the plurality of heating pipes 515. If the surface temperature Ts is greater than a cut off surface temperature Tc, then the programmable controller 505 instructs the pump 510 to stop pumping one of the heated water and the heated coolant liquid into the plurality of heating pipes 515 from the radiator 520. The pump 510 and the plurality of heating pipes 515 form the hydronic heater. The hydronic heater is configured to receive heated engine coolant from the radiator or engine block jacket, and circulate the heated engine coolant, thereby transferring heat to the exterior portion of the vehicle. An exemplary illustration of arrangement of the plurality of heating pipes 515 in the vehicle is given in FIG. 6.

Figure 6:
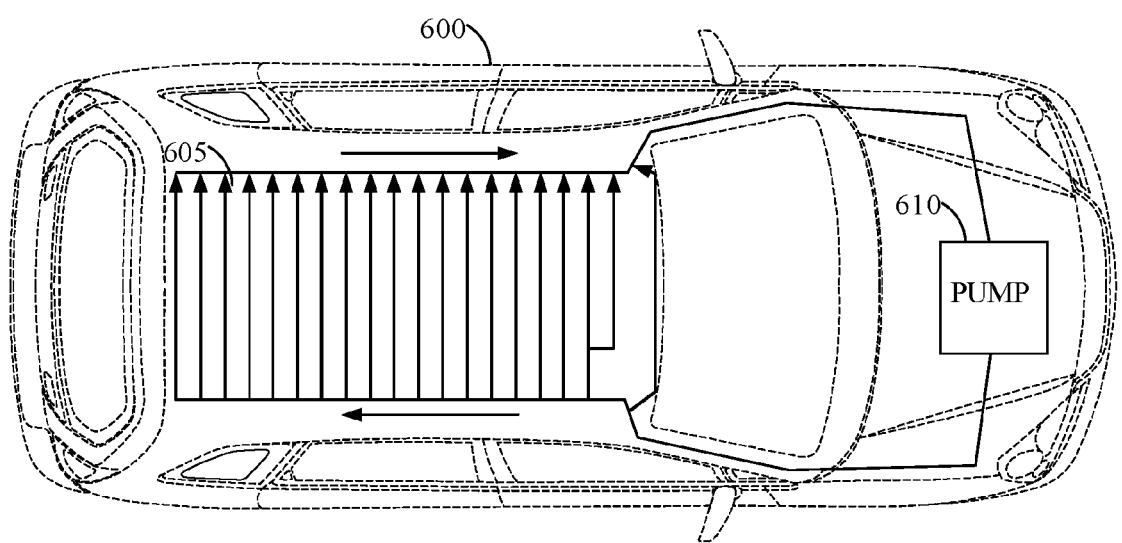
FIG. 6 is an exemplary illustration of implementation of a hydronic heater based apparatus for melting of snow and/or ice from vehicles, in accordance with various embodiments of the present invention.

Referring now to FIG. 6, a plurality of heating pipes 605 are arranged on roof of a car 600. The plurality of heating pipes 605 receives heated water or heated coolant liquid from a pump 610. An exemplary illustration of a heating pipe among the plurality of heating pipes 605, disposed on exterior of the vehicle is shown in FIG. 7.

Figure 7:
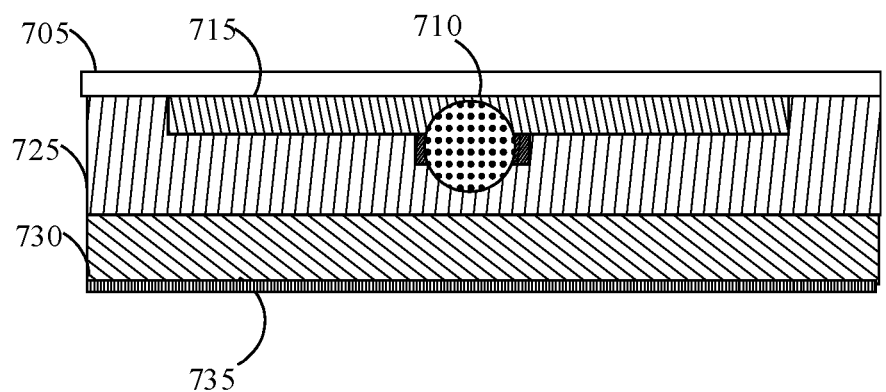
FIG. 7 is an exemplary illustration of a cross-section of the construction of the hydronic radiant heating tubes and surrounding vehicle within which such heating element resides, in accordance with various embodiments of the present invention.

Referring now to FIG. 7, a heating pipe 710 is secured directly below a roof 705 of a vehicle in a manner to maximize heat transfer between the heating pipes 710 and the roof 705. The heating pipe 710 is secured in place with a thermally conductive fastening layer 715. Further, the heating pipe 710 is separated from other heating pipes by a thermally conductive filler layer 725. The thermally conductive fastening layer 710 comprises of thermally conductive clips pre-formed with the roof 705, thermally conductive clips (as noted above) affixed to the roof 705 by means of welding or thermally conductive adhesives, thermally conductive polymer (or other material) substrate assembly in which the heating pipe 710 is embedded, said assembly then being secured to underside of the roof 705 by means of screws, bolts or clips with receivers formed in the roof 705. Additionally, to control heat distribution towards exterior of the roof 705), a layer of insulating material 730 is installed to cover a passenger compartment or cargo bay side of the vehicle. The layer of insulating material 730 minimizes heat transfer into the passenger compartment or the cargo bay.

In one example, the heating pipe 710 is sandwiched between underside of the roof 705 and an inner roof 735. Voids between the roof 705 and the inner roof 735 are filled with the thermally conductive filler layer 725 to promote heat distribution. The layer of insulating material 730 is installed to cover the passenger or cargo bay side of the vehicle.

Referring back to FIG. 6 and by way of further example, the plurality of heating pipes 605 is connected to the pump 610 via a plurality of pillars (not referenced with numerals), which support the roof structure from the body of the vehicle. The plurality of pillars are utilized as pathways to route necessary pipework between the plurality of heating pipes 605 and the pump 610. For cargo vehicles, piping between the plurality of heating pipes 605 and the pump 610, are routed in protective raceways mounted inside or outside the cargo vehicles.

Figure 8:
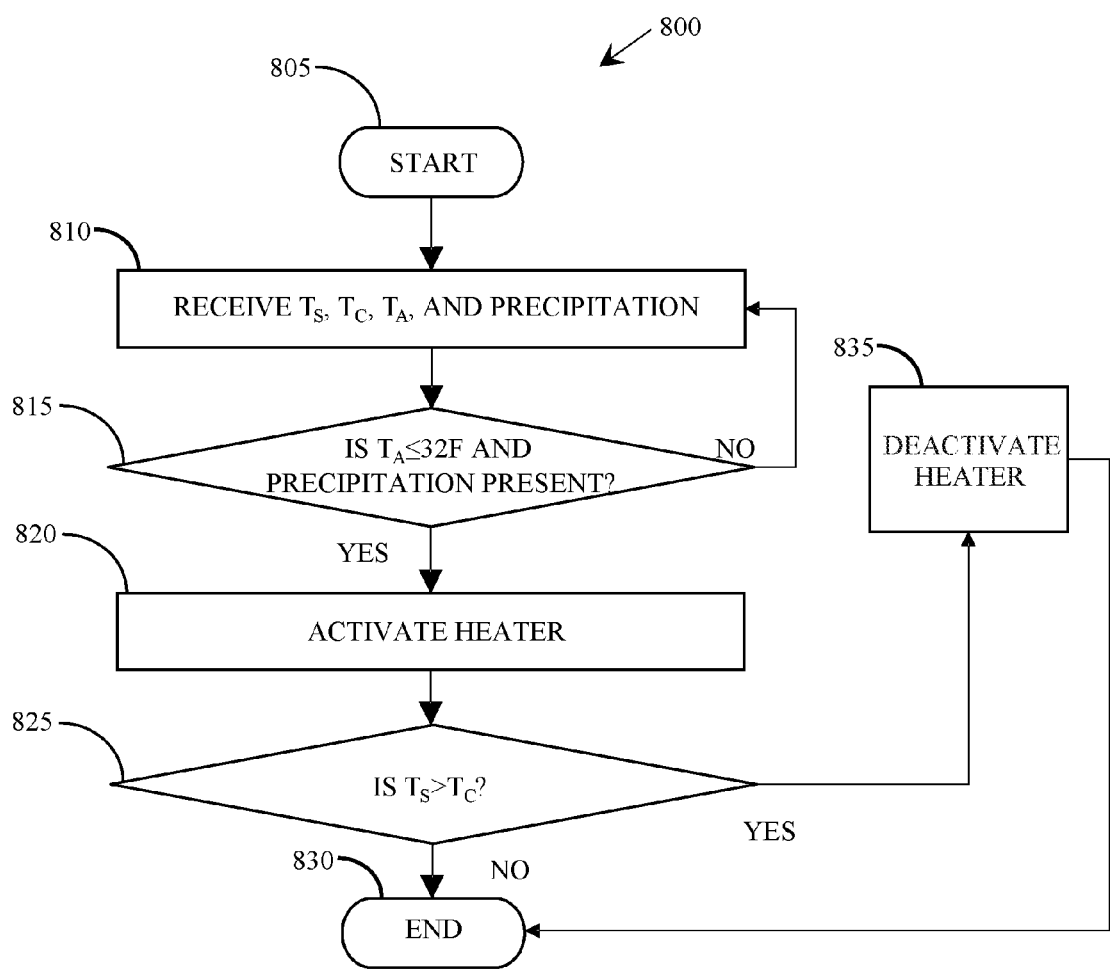
FIG. 8 is flow chart of a method of melting of snow and/or ice from vehicle exteriors, according to yet another embodiment of the present invention.

FIG. 8 is a flowchart of a method 800 for melting of snow and/or ice from vehicle exteriors, in accordance with various embodiments of the invention. The method 800 begins at step 805.

At step 810, the input module, executed by the processor, receives information regarding an ambient temperature Ta outside the vehicle via the ambient temperature sensor, information regarding one of presence and absence of precipitation outside the vehicle, via the precipitation sensor and information regarding a surface temperature Ts on an exterior portion of the vehicle via the surface temperature sensor.

At step 810, the processor compares the ambient temperature Ta with freezing point of water. Further, the processor checks if the precipitation is present. If the ambient temperature Ta is at or lower than the freezing point of water, and if precipitation is present, then the processor executes step 820. Otherwise, the processor executes step 810 again.

At step 820, the heater control module activates the heater thereby melting snow and/or ice on the vehicle.

At step 825, the processor checks if the surface temperature Ts is greater than the cut off surface temperature Tc. If the surface temperature Ts is greater than the cut off surface temperature Tc, then the processor executes step 835. Otherwise, the processor executes step 830.

At step 835, the heater control module, executed by the processor, deactivates the heater based on the surface temperature Ts being greater than the cut off surface temperature Tc.

The method 800 ends at step 830. It is to be understood that the cycle of method steps as shown in FIG. 8 can be repeated based on a clock timer, pre-set time intervals or at the instructions of the processor.

As stated above, examples of the vehicles include, but is not limited to: cars, trucks, vans, buses, minivans, Sports Utility Vehicles (SUV's), cross-over vehicles, trailer trucks and trains. The method 800 is implemented in an apparatus for melting of snow. The apparatus comprises a body control module, a programmable controller, and a heater. The body control module is an integral component of the vehicle, and comprises a precipitation sensor, a surface temperature sensor, and an ambient temperature sensor. In one example, the precipitation sensor is an optical sensor. In another example, the precipitation sensor is a TRW-Automotive model 7803 optical sensing system. In another example, the surface temperature sensor is at least one of a thermistor, and a thermocouple. In one example, the surface temperature is a QTI model QT06024A sensor. In yet another example, the ambient temperature sensor is a QTI model QT06005 sensor. Further, the apparatus comprises a programmable controller. The programmable controller is configured to activate and deactivate the heater. The programmable controller comprises a memory unit to store a cut off surface temperature Tc, and a set of program modules. The programmable controller further comprises a processor to execute the set of program modules. The set of program modules comprises an input module and a heater control module.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An apparatus for melting snow from exterior portion of the vehicle roof, the apparatus comprising:
   a precipitation sensor;
   an ambient temperature sensor;
   a surface temperature sensor;
   a heater embedded within the vehicle roof, wherein the heater is disposed between a thermally conductive layer and an insulating layer of the vehicle roof; wherein the thermally conductive layer comprises at least one of thermally conductive clips, wireways pre-formed with the roof, thermally conductive clips, wireways affixed to the roof by means of welding or thermally conductive adhesives, and pre-wired, thermally conductive polymer substrate assembly in which the heating cable is embedded, said assembly then being secured to underside of the roof by means of screws, bolts or clips with receivers formed in the roof, and wherein the insulating layer of the vehicle roof is installed to cover a passenger compartment or a cargo bay side of the vehicle, configured to minimize heat transfer into the passenger compartment or the cargo bay; and
   a programmable controller configured to activate and deactivate the heater, the programmable controller comprising:
   a memory unit to store a cut off surface temperature, and a set of program modules, and
   a processor to execute the set of program modules, wherein the set of program modules comprises:
   an input module, executed by the processor, configured to:
      receive information regarding an ambient temperature outside the vehicle via the ambient temperature sensor,
      receive information regarding one of presence and absence of precipitation outside the vehicle, via the precipitation sensor, and
      receive information regarding a surface temperature on an exterior portion of the vehicle via the surface temperature sensor; and
   a heater control module, executed by the processor, configured to:

deactivate the heater based on the surface temperature being greater than the cut off surface temperature, and activate the heater based on:
the ambient temperature being lower than a freezing point of water, and
precipitation outside the vehicle being present, thereby melting snow and/or ice on the vehicle roof.

2. The apparatus of claim 1, wherein the heater is at least one of the group consisting of an electric heater and a hydronic heater.

3. The apparatus of claim 2, wherein the electric heater comprises a plurality of heating cables sandwiched between underside of the roof and an inner roof, electrically coupled to at least one of the group consisting of an alternator and a remote electric power source via a relay, the plurality of heating cables configured to:
receive electric power from the electric power source, and
conductively transfer heat to the exterior portion of the vehicle via the thermally conductive layer, thereby melting the snow from the exterior portion of the vehicle roof.

4. The apparatus of claim 2, wherein the hydronic heater comprises a plurality of heating pipes sandwiched between underside of the roof and an inner roof, coupled to a radiator of the vehicle via an electric pump, and wherein the hydronic heater is configured to:
receive at least one of heated water and heated radiator coolant from the radiator, and
circulate the at least one of heated water and heated radiator coolant, thereby conductively transferring heat via the thermally conductive layer to the exterior portion of the vehicle roof.

5. A method of melting snow from exterior portion of the vehicle roof, the method comprising:
storing in a memory unit, a cut off surface temperature, and a set of program modules;
receiving, by a processor executing an input module, information regarding an ambient temperature outside the vehicle, from an ambient temperature sensor;
receiving, by the processor executing the input module, information regarding one of presence and absence of precipitation outside the vehicle, from the precipitation sensor;
receiving, by the processor executing the input module, information regarding a surface temperature on an exterior portion of the vehicle, from the surface temperature sensor;

deactivating, by the processor executing a heater control module, the heater based on the surface temperature being greater than the cut off surface temperature; and
activating the heater embedded within the vehicle roof, wherein the heater is disposed between a thermally conductive layer and an insulating layer of the vehicle roof, wherein the thermally conductive layer comprises at least one of thermally conductive clips, wireways pre-formed with the roof, thermally conductive clips, wireways affixed to the roof by means of welding or thermally conductive adhesives, and pre-wired, thermally conductive polymer substrate assembly in which the heating cable is embedded, said assembly then being secured to underside of the roof by means of screws, bolts or clips with receivers formed in the roof, and wherein the insulating layer of the vehicle roof is installed to cover a passenger compartment or a cargo bay side of the vehicle, configured to minimize heat transfer into the passenger compartment or the cargo bay, by the processor executing the heater control module, based on:
the ambient temperature being lower than a freezing point of water, and
precipitation outside the vehicle being present, thereby melting the snow from the vehicle roof.

6. The method of claim 5, wherein the heater is at least one of the group consisting of an electric heater and a hydronic heater.

7. The method of claim 6, wherein the electric heater comprises a plurality of heating cables sandwiched between underside of the roof and an inner roof, electrically coupled to at least one of the group consisting of an alternator and a remote electric power source via a relay, the plurality of heating cables configured to:
receive electric power from the electric power source, and
conductively heat the exterior portion of the vehicle via the thermally conductive layer, thereby melting the snow from the exterior portion of the vehicle roof.

8. The method of claim 6, wherein the hydronic heater comprises a plurality of heating pipes sandwiched between underside of the roof and an inner roof, coupled to a radiator of the vehicle via an electric pump, and wherein the hydronic heater is configured to:
receive at least one of heated water and heated radiator coolant from the radiator, and
circulate the at least one of heated water and heated radiator coolant, thereby conductively transferring heat via the thermally conductive layer to the exterior portion of the vehicle roof.

\* \* \* \* \*